United States Patent
Zheng et al.

(10) Patent No.: US 9,979,762 B2
(45) Date of Patent: May 22, 2018

(54) DATA TRANSMISSION METHOD AND SYSTEM THEREOF

(71) Applicant: Lenovo (Beijing) Co., Ltd., Beijing (CN)

(72) Inventors: Fan Zheng, Beijing (CN); Pengcheng Jia, Beijing (CN); Changjian Hu, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 167 days.

(21) Appl. No.: 14/834,916

(22) Filed: Aug. 25, 2015

(65) Prior Publication Data

US 2016/0277464 A1    Sep. 22, 2016

(30) Foreign Application Priority Data

Mar. 16, 2015 (CN) .......................... 2015 1 0113157

(51) Int. Cl.
*H04H 20/71* (2008.01)
*H04L 29/06* (2006.01)
*H04L 12/815* (2013.01)
*H04L 12/803* (2013.01)

(52) U.S. Cl.
CPC ........ *H04L 65/4076* (2013.01); *H04L 47/125* (2013.01); *H04L 47/22* (2013.01)

(58) Field of Classification Search
CPC .................................................... H04L 65/4076
USPC ............................................................ 370/312
See application file for complete search history.

(56) References Cited

U.S. PATENT DOCUMENTS

2002/0059304 A1* 5/2002 Nishiyama ............ G01C 21/26
2013/0332622 A1* 12/2013 Wang ................ H04L 29/06517
                                                                  709/231

* cited by examiner

*Primary Examiner* — Shripal Khajuria
(74) *Attorney, Agent, or Firm* — Harness, Dickey & Pierce, P.L.C.

(57) ABSTRACT

A data transmission method and a system thereof are provided according to the disclosure. A first type is determined for the data to be transmitted by the first data terminal in the local area network, data of the first type stored in all data terminals in the local area network is detected and is transmitted to the server in accordance with the first predetermined rule, where the first terminal is any one of the data terminals in the local area network.

9 Claims, 3 Drawing Sheets

DATA TRANSMISSION METHOD AND SYSTEM THEREOF

CROSS REFERENCE TO RELATED APPLICATIONS

The present application claims the priority to Chinese Patent Application No. 201510113157.X, titled "DATA TRANSMISSION METHOD AND SYSTEM THEREOF", filed on Mar. 16, 2015 with the State Intellectual Property Office of People's Republic of China, which is incorporated herein by reference in its entirety.

FIELD

The disclosure relates to the technical field of data acquisition, and in particular, to a data transmission method and a system thereof.

BACKGROUND

Nowadays, in the conventional data acquisition mechanisms, after acquiring various data, a data terminal generally transmits directly the acquired data to a server, and then the server analyzes and processes the received data as needed.

Therefore, with the conventional method of transmitting data by the data terminal, various data can be acquired timely, however, for a case that a large number of data terminals transmit small data frequently, the server is required to establish and release network connections with the larger number of data terminals frequently, which cause large load of the server and waste of network resources, furthermore, the data of a specific type can not be acquired quickly since the server collects all data in the same way.

SUMMARY

In view of the above, a data transmission method and a system thereof provided according to embodiments of the disclosure, resource wastes caused by long-term occupation of resources by the data terminals and large load of the server caused by the direct transmission of data in conventional technology, are avoided, and data of a specific type can be acquired quickly.

In order to achieve the above object, the following technical solutions are provided according to the disclosure.

A data transmission method is provided, which includes:

determining a first type for data to be transmitted by a first data terminal in a local area network, where the first data terminal is any one of data terminals included in the local area network;

detecting the data of the first type stored in the data terminals in the local area network; and transmitting the detected data of the first type to a server in accordance with a first predetermined rule.

Preferably, the transmitting the detected data of the first type to a server in accordance with a first predetermined rule includes:

counting first data amounts of the data of the first type stored in respective data terminals in the local area network;

determining one or more target data terminals in the local area network based on the first data amounts;

transmitting the detected data of the first type stored in data terminals with data to be transmitted in the local area network to the one or more target data terminals in accordance with a second predetermined rule, where the data terminals with data to be transmitted are data terminals other than the one or more target data terminals in the local area network; and controlling the one or more target data terminals to transmit directly the data of the first type currently stored in the one or more target data terminals to the server.

Preferably, the determining one or more target data terminals in the local area network based on the first data amounts includes:

determining, from all data terminals in the local area network, one or more data terminals as the one or more target data terminals, where the first data amount of the data of the first type stored in each of the one or more data terminals is greater than a first threshold; and the transmitting the detected data of the first type stored in data terminals with data to be transmitted in the local area network to the one or more target data terminals in accordance with a second predetermined rule includes:

transmitting the data of the first type stored in the data terminals with data to be transmitted to the one or more target data terminals, to reduce the number of the data terminals with data to be transmitted which includes the data of the first type.

Preferably, after the counting first data amounts of the data of the first type stored in respective data terminals in the local area network, and before the determining one or more target data terminals based on the first data amounts, the method further includes:

judging whether there is a data terminal of which the first data amount reaches a predetermined data granularity threshold or the current length of time for data acquisition reaches a predetermined first time threshold in the local area network;

determining the data terminal of which the first data amount reaches the predetermined data granularity threshold or the current length of time for data acquisition reaches the predetermined first time threshold as a target data terminal and performing directly the process of controlling the target data terminal to transmit directly the data of the first type currently stored in the target data terminal to the server, in a case that there is the data terminal of which the first data amount reaches the predetermined data granularity threshold or the current length of time for data acquisition reaches the predetermined first time threshold in the local area network; or performing the determining one or more target data terminals in the local area network based on the first data amounts, in a case that there is no data terminal of which the first data amount reaches the predetermined data granularity threshold or the current length of time for data acquisition reaches the predetermined first time threshold in the local area network.

Preferably, after the determining a first type for data, and before the detecting the data of the first type stored in the data terminals in the local area network, the method further includes:

broadcasting data information to the local area network, where the data information includes the first type of the data to be transmitted by the first data terminal.

Preferably, after the counting first data amounts of the data of the first type stored in respective data terminals in the local area network, the method further includes:

summing the first data amounts of the data of the first type stored in respective data terminals in the local area network to obtain a current total data amount;

summing current lengths of time of data acquisition for respective data terminals in the local area network to obtain a current total length of acquisition time;

adjusting the predetermined data granularity threshold according to a predetermined first attenuation function, in a case that it is determined that the current total data amount reaches a predetermined first attenuation threshold; and adjusting the predetermined first time threshold according to a predetermined second attenuation function, in a case that it is determined that the current total length of acquisition time reaches a predetermined second attenuation threshold.

A data transmission system is provided, which includes:

a first determination module, configured to determine a first type for data to be transmitted by a first data terminal in a local area network, where the first data terminal is any one of data terminals included in the local area network;

a detection module, configured to detect the data of the first type stored in the data terminals in the local area network; and a first transmission module, configured to transmit the detected data of the first type to a server in accordance with a first predetermined rule.

Preferably, the first transmission module includes:

a first counting unit, configured to count first data amounts of the data of the first type stored in respective data terminals in the local area network;

a first determination unit, configured to determine one or more target data terminals in the local area network based on the first data amounts;

a first transmission unit, configured to transmit the detected data of the first type stored in data terminals with data to be transmitted in the local area network to the one or more target data terminals in accordance with a second predetermined rule, where the data terminals with data to be transmitted are data terminals other than the one or more target data terminals in the local area network; and a first control unit, configured to control the one or more target data terminals to transmit directly the data of the first type currently stored in the one or more target data terminals to the server.

Preferably, the first determination unit includes:

a determination sub-unit, configured to determine, from all data terminals in the local area network, one or more data terminals as the one or more target data terminals, where the first data amount of the data of the first type stored in each of the one or more data terminals is greater than a first threshold; and the first transmission module is configured to transmit the data of the first type stored in the data terminals with data to be transmitted to the target data terminal, until the amount of the data of the first type stored in the target data terminal reaches a predetermined data granularity threshold, to reduce the number of the data terminals with data to be transmitted which includes the data of the first type.

Preferably, the system further includes:

a judgment module, configured to judge whether there is a data terminal of which the first data amount reaches a predetermined data granularity threshold or the current length of time for data acquisition reaches a predetermined first time threshold in the local area network, and trigger the first determination unit if there is no data terminal of which the first data amount reaches the predetermined data granularity threshold or the current length of time for data acquisition reaches the predetermined first time threshold in the local area network, and trigger the first determination unit; and a second determination module, configured to determine the data terminal of which the first data amount reaches the predetermined data granularity threshold or the current length of time for data acquisition reaches the predetermined first time threshold as a target data terminal and trigger the first control unit, in a case that it is judged by the judgment module that there is the data terminal of which the first data amount reaches a predetermined data granularity threshold or the current length of time for data collection reaches the predetermined first time threshold in the local area network.

Preferably, the system further includes:

a broadcasting module, configured to broadcast data information to the local area network, where the data information includes the first type of the data to be transmitted by the first data terminal.

Preferably, the system further includes:

a first counting module, configured to sum the first data amounts of the data of the first type stored in respective data terminals in the local area network to obtain a current total data amount;

a second counting module, configured to sum current lengths of time of data acquisition for respective data terminals in the local area network to obtain a current total length of acquisition time;

a first adjustment module, configured to adjust the predetermined data granularity threshold according to a predetermined first attenuation function, in a case that it is determined that the current total data amount reaches a predetermined first attenuation threshold; and a second adjustment module, configured to adjust the predetermined first time threshold according to a predetermined second attenuation function, in a case that it is determined that the current total length of acquisition time reaches a predetermined second attenuation threshold.

According to above description, a data transmission method and a system thereof are provided according to the disclosure. In the disclose, the first type is determined for the data to be transmitted by the first data terminal in the local area network, data of the first type stored in all data terminals in the local area network is detected and is transmitted to the server in accordance with the first predetermined rule, where the first terminal is any one of the data terminals in the local area network. With the method, in which data of a determined type in the local area network are collected and transmitted to the server, resource wastes and an increased server load caused by the conventional method, in which data of various types acquired by the data terminals in the local area network is transmitted directly to the server in real time, and then the server analyzes and processes the received data to obtain the data of the desired type, are avoided, and the data of a specific type can be acquired quickly.

BRIEF DESCRIPTION OF THE DRAWINGS

In order to illustrate technical solutions according to embodiments of the disclosure or in the conventional technology more clearly, the following briefly describes the drawings according to embodiments of the disclosure. Apparently, the drawings are only some embodiments of the present disclosure, and other drawings may be obtained by those skilled in the art according to those drawings without creative efforts.

DETAILED DESCRIPTION OF THE EMBODIMENTS

Technical solutions of the embodiments of the present disclosure will be illustrated completely and clearly in combination with the following drawings of the embodiments of the disclosure. Apparently, the described embodiments are merely a few rather than all of the embodiments of the present disclosure. All other embodiments obtained by persons of ordinary skill in the art based on the embodiment of the present disclosure without creative efforts shall fall within the protection scope of the claimed invention.

A data transmission method and a system thereof are provided according to the disclosure. In the disclosure, a first type is determined for the data to be transmitted by a first data terminal in a local area network, data of the first type stored in all data terminals in the local area network is detected and is transmitted to a server in accordance with a first predetermined rule, where the first terminal is any one of the data terminals in the local area network. With the method, in which data of a determined type in the local area network are collected and transmitted to the server, resource wastes and an increased server load caused by the conventional method, in which data of various types collected respectively by the data terminals in the local area network is transmitted directly to the server in real time, and then the server analyzes and processes the received data to obtain the data of the desired type, are avoided, and the data of a specific type can be acquired quickly.

In the following, the disclosure is illustrated in detail in conjunction with the drawings and specific embodiments.

Figure 1:
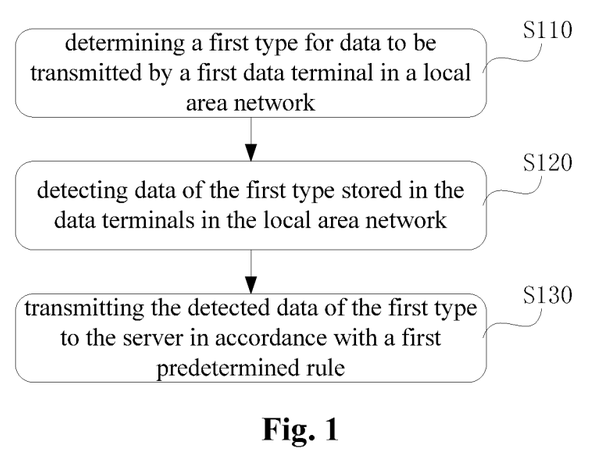
FIG. 1 is a schematic flowchart of a data transmission method according to an embodiment of the disclosure.

FIG. 1 is a schematic flowchart of a data transmission method according to an embodiment of the disclosure, and the method may include steps S110 to S130.

In step S110, a first type is determined for the data to be transmitted by a first data terminal in a local area network.

In a practical application, the local area network generally includes multiple data terminals, and the first data terminal in step S110 according to the embodiment is any one of the data terminals included in the local area network. That is, during the data acquisition by the data terminals in the local area network, in a case that it is determined that the data terminal is about to transmit the data to the server, the type of the data is determined before the data is transmitted by the data terminal, to reduce the load of the server. The type of the data may be determined based on the data acquired by the data terminal, which is not limited herein.

It can be seen that, in the embodiment, before data of a type is acquired and transmitted to the server by the data terminal, the type of the data is known, thereby addressing the conventional technical problem that if the server processes all acquired data in the same way, the requirement of acquiring data of a specific type can not be satisfied, thus the server needs to analyze and process the acquired data, to determine the type of data transmitted by each data terminal, which is tedious, and increases the load of the server.

Based on above analysis, in a practice application, the type of the data to be transmitted by the first data terminal may be determined directly by the first data terminal; alternatively, the type of the data to be transmitted by the first data terminal may be determined by a controller, which is not limited herein.

In step S120, data of the first type stored in the data terminals in the local area network is detected.

In a practice application, in order to reduce the occupation time for the resources of the data terminals and improve the efficiency of data acquisition by the server, after the type (namely a first type) of the data to be transmitted by the first data terminal in the local area network is determined, whether the data of the first type is acquired currently by other data terminals in the local area network is detected, so that the data of the first type acquired by the data terminals in the local area network is collected and transmitted to the server in a case that the data of the first type is acquired by other data terminals, as described in detail below.

After the type of the data to be transmitted by the first data terminal in the local area network is determined, data information may be transmitted to the local area network in a broadcast manner. The data information includes the type of the data to be transmitted by the first data terminal, namely the first type, and other data terminals in the local area network are notified that the data of the first type is about to be transmitted, so that the other data terminals in the local area network may query whether there is the data of the first type stored in the other data terminals based on the data information, and notify the first data terminal or the controller of the query results, to perform subsequent operations of the first data terminal or the controller.

After the data information is broadcasted in the local area network, the data of the first type stored in the other data terminals in the local area network may be detected directly by the controller. The subject and the specific way of detection in step S120 are not limited herein, and both fall into the scope of the disclosure, as long as the subject and the specific way of detection are determined by those skilled in the art without creative efforts.

In step S130, the detected data of the first type is transmitted to the server in accordance with a first predetermined rule.

In view of above, in the embodiment, after it is determined that a data terminal in the local area network is about to transmit data with a type, the data of the type stored in all data terminals which are included in the same local area network as the data terminal is collected and transmitted to the server, thereby achieving acquisition of data of various types by the server. Apparently, with the method in which data is collected inside the local area network, the efficiency of data acquisition is improved greatly, resource wastes and an increased server load caused by the conventional method are solved, for the ways that data of various types acquired by the data terminals in the local area network is transmitted directly to the server in real time, and then the server analyzes and processes the received data to obtain the data of the desired type, are avoided, and the data of a specific type can be acquired quickly.

Optionally, on the basis of the above embodiment, the process of data transmission in step S130 may include: transmitting the data of the first type stored in the data terminals in the local area network to a data terminal, and directly transmitting the data of the first type, by the data terminal to the server, thereby reducing the resources of the data terminals occupied by the server for acquiring the data of the first type.

In another embodiment of the disclosure, the process of data transmission in step S130 may alternatively include: transmitting the data of the first type stored in the data terminals in the local area network to multiple data terminals (the number of the multiple data terminals is less than the number of all data terminals included in the local area network). The multiple data terminals, as transmitters, transmit the data of the first type which is stored currently in the multiple data terminals to the server directly, thereby reducing the resource wastes for the data terminals compared with conventional method, in which the resources of all data terminals included in the local area network are occupied by the server.

Figure 2:
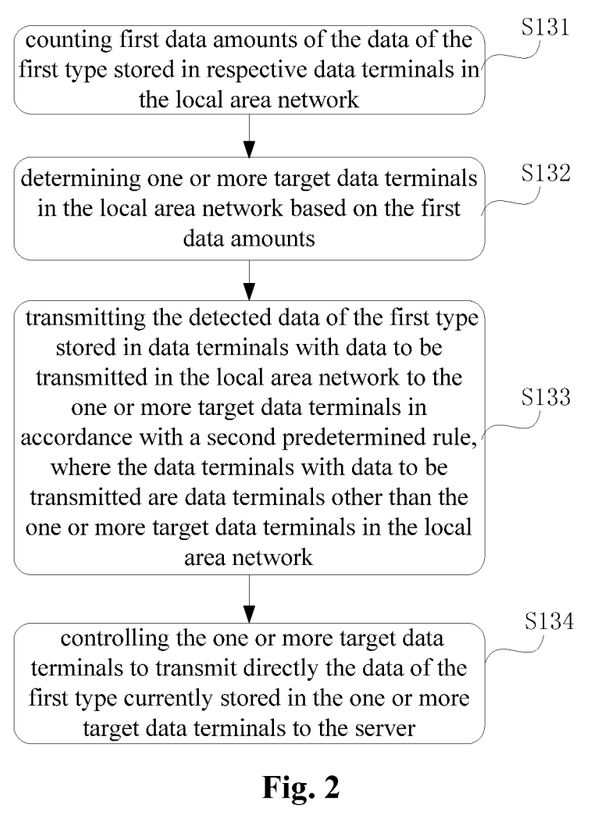
FIG. 2 is a schematic flowchart of a part of a data transmission method according to an embodiment of the disclosure.

Based on the above analyses, FIG. 2 shows a schematic flowchart of a part of a data transmission method according to another embodiment of the disclosure, and the implementation process of the above step S130 may include steps S131 to S134.

In step S131, first data amounts of the data of the first type stored in all respective data terminals in the local area network are counted.

In the embodiment, the first data amounts of the data of the first type stored in respective data terminals in the local area network may be counted by a controller, or may be counted by the data terminals themselves, which is not limited herein.

A data granularity threshold and a time threshold for data transmission by data terminals in the local area network are set in the disclosure. The data granularity threshold is a critical value for transmitting, by a data terminal, data of a type acquired by the data terminal. That is, in a case that the amount of the data of the type stored in the data terminal reaches the data granularity threshold, the data of the type may be transmitted directly by the data terminal to the server, without transmitting the data of the type to other data terminals or receiving the data of the type transmitted by other data terminals. The time threshold is a limit of a length of time after last data transmission by the data terminal. That is in a case that the length of time of the data acquisition by the data terminal reaches the time threshold, the data terminal may transmit directly the data of the first type stored in the data terminal to the server, without transmitting the data of the type to other data terminals or receiving the data of the type transmitted by other data terminals.

Based on the data granularity threshold and the time threshold, after step S131, whether there is a data terminal of which the first data amount reaches a predetermined data granularity threshold or the current length of time for data acquisition reaches a predetermined first time threshold in the local area network may be judged in the disclosure, if the judgement result is positive, the data terminal of which the first data amount reaches the predetermined data granularity threshold or the current length of time for data acquisition reaches the predetermined first time threshold is determined as a target data terminal, and step S133 is performed directly, and if the judgement result is negative, step S132 is performed.

Thus, during the data transmission according to the disclosure, the transmission frequency is controllable by adding the data granularity threshold, which may be achieved by adjusting the data granularity and is not described in detail herein. Furthermore, in a case that the judgment of the first time threshold is added, besides the first type, the data information broadcasted in the local area network may further include an information field, namely a time field, which indicates a length of time before directly transmitting the data of the first type. The controllability of data transmission is improved by adding the first time threshold.

Optionally, the above data granularity threshold and first time threshold may be configured by using an attenuation function. The first data amounts of the data of the first type stored in respective data terminals in the local area network are summed to obtain a current total data amount, and the current lengths of time of data acquisition for respective data terminals in the local area network are summed to obtain a current total length of acquisition time, and then the current total data amount and the current total length of acquisition time are judged. The predetermined data granularity threshold is adjusted according to a predetermined first attenuation function, in a case that it is determined that the current total data amount reaches a predetermined first attenuation threshold; and the data of the first type stored in each of the data terminals is judged based on the adjusted data granularity threshold. Similarly, the predetermined first time threshold is adjusted according to a predetermined second attenuation function, in a case that it is determined that the current total length of acquisition time reaches a predetermined second attenuation threshold.

The specific expressions of the first attenuation function and the second attenuation function are not defined in the disclosure, and may be determined in conjunction with results of multiple tests as needed. Specific test methods are customary technical means in the art, which are not described in detail herein.

Optionally, in a practical application, it may be set that the priority of the first time threshold is higher than the priority of the data granularity threshold in the disclosure, that is, during the first time threshold, the amount of the data collected by the data terminal and the data received from the other data terminals do not reach the data granularity threshold, and when the length of time for acquisition by the data terminal reaches the first time threshold, the data is packed and is directly transmitted to the server.

In step S132, one or more target data terminals in the local area network are determined based on the first data amounts.

In the embodiment, one or more data terminals are determined as the one or more target data terminals from all data terminals in the local area network, where the first data amount of the data of the first type stored in each of the one or more data terminals is greater than a first threshold. The first threshold may be determined based on the amount of data of the first type stored in the data terminals in the local area network as needed, which is not limited herein.

Based on the above analyses, a data terminal with the maximum first data amount of the data of the first type may be determined as the target data terminal from all data terminals in the local area network; the first data terminal which broadcasts data information to the local area network may be determined as the target data terminal; or a part of the data terminals in the local area network may alternatively be determined as the target data terminals, which is not limited herein.

In step S133, the data of the first type stored in detected data terminals with data to be transmitted in the local area network is transmitted to the one or more target data terminals in accordance with a second predetermined rule, where the data terminals with data to be transmitted are data terminals other than the one or more target data terminals in the local area network.

An example of the above process of determining the one or more target data terminals is illustrated in detail below according to the disclosure.

If the local area network includes a data terminal A, a data terminal B, a data terminal C, a data terminal D and a data terminal E. In a case that it is determined that data of a W type (namely data of a first type) is about to be transmitted by the data terminal A, it is detected that the data terminal A includes 8 pieces of data of the W type, the data terminal B includes 4 pieces of data of the W type, the data terminal C includes 6 pieces of data of the W type, the data terminal D includes 2 pieces of data of the W type, and the data terminal E does not include data of the W type. In this case, through comparison of the amounts of the data of the W type stored in respective data terminals, the data terminal A with maximum amount of data of the W type may be determined as the target data terminal, and the data of the W type stored in the data terminal B, the data terminal C, the data terminal D and the data terminal E is transmitted to the data terminal A.

Furthermore, if the data granularity threshold for the data terminals is set as 10, through comparison of the amounts of the data of the W type stored in the respective data terminals, the data terminal A and the data terminal C may be determined as the target data terminals, 4 pieces of data of the W type stored in the data terminal B are transmitted to the data terminal C, and 2 pieces of data of the W type stored in the data terminal D are transmitted to the data terminal A. In a case that the data terminal D includes 3 pieces of data of the W type, it may be calculated directly based on the current data granularity threshold that how many pieces of data of the W type should be transmitted by the data terminal D to the data terminal A after it is determined that the data terminal D should transmit data to the data terminal A, alternatively, the data amount of the data of the W type currently stored in the data terminal A may be calculated in real time when the data terminal D transmits the data of the W type to the data terminal A, and the data transmission is stopped when the data amount of the data of the W type currently stored in the data terminal A reaches the predetermined current data granularity threshold, which is not limited herein.

An additional example, the first time threshold is further applied on the setting of the above data granularity threshold. During transmission of the data of the W type between the above data terminals, in a case that the current length of time for acquisition of the data of the W type stored in the data terminal reaches the first time threshold, the data terminal is stopped from transmitting the data of the W type to other data terminals, or stopped from receiving the data of the W type from other data terminals and the data terminal is used as the target data terminal.

It should be noted that the disclosure is not limited to the above various ways of determining the target data terminal and transmitting the data of the W type to the target data terminal, and all other ways made by those skilled in the art without creative efforts should fall into the scope of the disclosure, which is not described herein.

In step S134, the one or more target data terminals are controlled to transmit directly the data of the first type currently stored in the one or more target data terminals to the server.

The number of the above determined target data terminals is less than the number of the data terminals in the local area network, thus in the embodiment of the disclosure, the data of the first type stored in the data terminals in the local area network is transmitted to the one or more target data terminals, and the data of the first type is transmitted by the one or more target data terminals to the server. In this case, the number of the data terminals connected with the server is reduced, thereby saving the resources of the data terminals and the local area network. Furthermore, there is no need for the server to analyze the received data to obtain the data of the desired type, thereby reducing the work load of the server.

Figure 3:
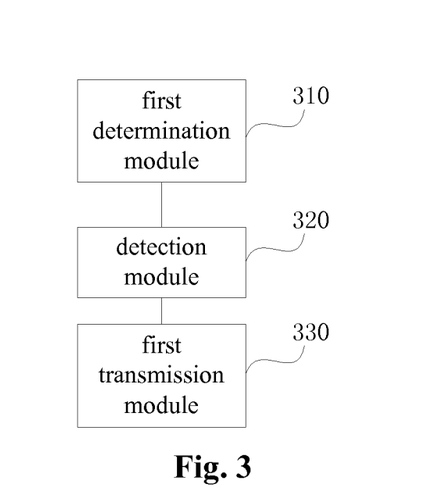
FIG. 3 is a schematic structural diagram of a data transmission system according to an embodiment of the disclosure.

FIG. 3 is a schematic structural diagram of a data transmission system according to an embodiment of the disclosure, and the system according to the embodiment may include a first determination module 310, a detection module 320 and a first transmission module 330.

The first determination module 310 is configured to determine a first type for data to be transmitted by a first data terminal in a local area network.

In a practical application, a local area network generally includes multiple data terminals, and the first data terminal in the embodiment is any one of data terminals included in the local area network.

Furthermore, the type of the data to be transmitted by the data terminal may be determined based on factors such as acquisition objects and acquisition purposes of the data terminal, for example, data for testing performance of a device, data for repairing a function of a device and data including specific content, which is not enumerated herein.

The detection module 320 is configured to detect data of the first type stored in the data terminals in the local area network.

In the embodiment, the detection module 320 may be located in a controller of the system, or may alternatively be located in the data terminal in the local area network, which is not limited herein.

The first transmission module 330 is configured to transmit the detected data of the first type to a server in accordance with a first predetermined rule.

Figure 4:
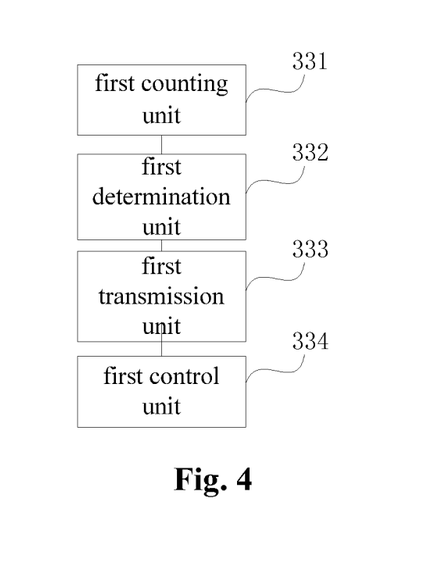
FIG. 4 is a schematic structural diagram of a part of a data transmission system according to an embodiment of the disclosure.

Optionally, FIG. 4 shows a schematic structural diagram of a part of a data transmission system according to another embodiment of the disclosure, and the first transmission module 330 may include a first counting unit 331, a first determination unit 332, a first transmission unit 333 and a first control unit 334.

The first counting unit 331 is configured to count first data amounts of the data of the first type stored in respective data terminals in the local area network.

In the embodiment, the first counting unit 331 may be a counting unit in a controller of the system, or may alternatively be a counting unit in the data terminal in the local area network, which is not limited herein.

The first determination unit 332 is configured to determine one or more target data terminals in the local area network based on the first data amount.

The target data terminal may be a first data terminal, may be a data terminal with maximum amount of data of the first type in the local area network, or may be a part of data terminals in the local area network, which is not limited herein.

In view of this, the first determination unit 332 may include:

a determination sub-unit, configured to determine, from all data terminals in the local area network, one or more data terminals as the target data terminals, where the first data amount of the data of the first type stored in each of the one or more data terminals is greater than a first threshold.

The first transmission module 330 is configured to transmit the data of the first type stored in the data terminals with data to be transmitted to the one or more target data terminals, until the amount of the data of the first type stored in each target data terminal reaches a predetermined data granularity threshold, to reduce the number of the data terminals with data to be transmitted which includes the data of the first type, the implementation process of which may refer to the description of the corresponding part in the above method embodiment, and is omitted herein.

The first transmission unit 333 is configured to transmit the detected data of the first type stored in data terminals with data to be transmitted in the local area network to the one or more target data terminals in accordance with a second predetermined rule.

The data terminals with data to be transmitted are data terminals other than the one or more target data terminals in the local area network.

Combined with above analyses, above transmission operation may be performed in accordance with the second predetermined rule which is established based on reduction of the number of the data terminals with data to be transmitted which includes the data of the first type, the implementation process of which may refer to the description of the corresponding part in the above method embodiment, and is not described in detail herein.

The first control unit 334 is configured to control the one or more target data terminals to transmit directly the data of the first type currently stored in the one or more target data terminals to the server.

In view of above, in the embodiment, in a case that the first data terminal in the local area network is about to transmit data, the first type is determined for the data by the first determination unit, data of the first type stored in all data terminals in the local area network are detected by the detection module, and the data of the first type are collected and transmitted by the first transmission module to the server in accordance with the first predetermined rule, thereby improving efficiency of data acquisition, and acquiring the data of a specific type, while resource wastes and an increased server load caused by the conventional method, in which data of various types acquired by the data terminals in the local area network is transmitted directly to the server in real time, and then the server analyzes and processes the received data to obtain the data of the desired type, are avoided.

Figure 5:
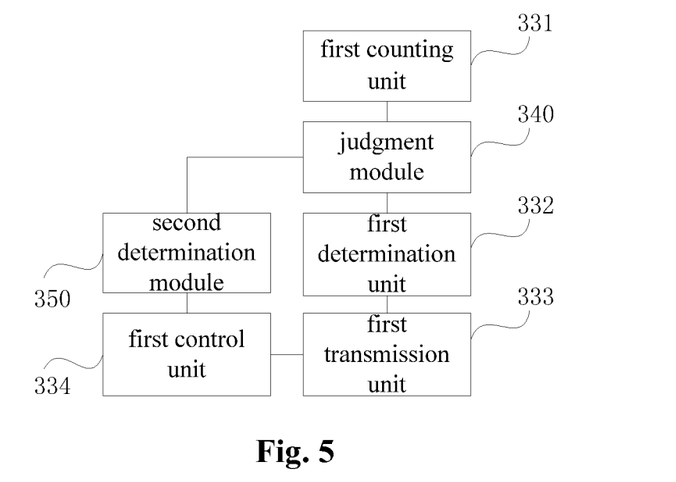
FIG. 5 is a schematic structural diagram of a part of a data transmission system according to another embodiment of the disclosure.

Optionally, FIG. 5 shows a schematic structural diagram of a part of a data transmission system according to another embodiment of the disclosure. On the basis of the system according to above embodiment, the system may further include a judgment module 340 and a second determination module 350.

The judgment module 340 is configured to judge whether there is a data terminal of which the first data amount reaches a predetermined data granularity threshold or the current length of time for data acquisition reaches a predetermined first time threshold in the local area network, and trigger the first determination unit 332 if there is no data terminal of which the first data amount reaches the predetermined data granularity threshold or the current length of time for data acquisition reaches the predetermined first time threshold in the local area network, and trigger the first determination unit.

The meanings and influence factors for the data granularity threshold and the first time threshold may refer to the description of the corresponding part in the above method embodiment, which is not described herein.

The second determination module 350 is configured to determine the data terminal of which the first data amount reaches the predetermined data granularity threshold or the current length of time for data acquisition reaches the predetermined first time threshold as a target data terminal and trigger the first control unit 334, in a case that it is judged by the judgment module that there is the data terminal of which the first data amount reaches the predetermined data granularity threshold or the current length of time for data collection reaches the predetermined first time threshold in the local area network.

Based on the above analyses in the embodiment, the judgments of the data granularity threshold and the first time threshold are added in the process of data transmission according to the embodiment, thereby improving the controllability of the data acquisition and greatly improving the efficiency of the data acquisition.

Optionally, on the basis of the system according to the above embodiment, the data transmission system according to the disclosure may further include:

a first counting module, configured to sum the first data amounts of the data of the first type stored in respective data terminals in the local area network to obtain a current total data amount;

a second counting module, configured to sum current lengths of acquisition time for the data in respective data terminals in the local area network to obtain a current total length of acquisition time;

a first adjustment module, configured to adjust the predetermined data granularity threshold according to a predetermined first attenuation function, in a case that it is determined that the current total data amount reaches a predetermined first attenuation threshold; and a second adjustment module, configured to adjust the predetermined first time threshold according to a predetermined second attenuation function, in a case that it is determined that the current total length of acquisition time reaches a predetermined second attenuation threshold.

Optionally, on the basis of the above embodiments, the data transmission system according to the disclosure may further include:

a broadcasting module, configured to broadcast data information to the local area network, where the data information includes the first type of the data to be transmitted by the first data terminal.

It should be noted that, the data information may further include other content as needed, such as waiting time for data to be transmitted by the first data terminal, which is not limited herein.

It should be noted that, a relationship term such as "the first" and "the second" herein is only used to distinguish one entity or operation from another entity or operation, and does not necessarily acquire or imply that there is an actual relationship or sequence between these entities or operations. Furthermore, terms "include", "comprise" or any other variations are intended to cover non-exclusive "include", so that a process, a method, an object or a device including a series of factors not only include the factors, but also include other factors not explicitly listed, or also include inherent factors of the process, the method, the object or the device. Without more limitation, a factor defined in a sentence "include one . . . " does not exclude a case that there is also another same factor in the process, the method, the object or the device including the described factor.

According to the description of the above embodiments, those of skilled in the art can clearly understand that the disclosure may be implemented through software and necessary general hardware platforms. Based on such understanding, the essence of the technical solutions, or the part of the disclosure which makes contribution to conventional technology or the essence of the technical solution may be embodied in the a form of the a software product, which may be stored in a storage medium including ROM/RAM, a magnetic disk, a CD, or a plurality of instructions configured to enable a compute device (may be a personal computer, a server or a network device, etc) to execute all or part of the method according to the embodiments of the disclosure.

The embodiments of the present disclosure are described herein in a progressive manner, and each embodiment places emphasis on the difference from other embodiments, therefore one embodiment can refer to other embodiments for the same or similar parts. For the apparatus disclosed in the embodiments, since the apparatus corresponds to the method disclosed in the embodiments, the description is relatively simple, and relevant part of the description may refer to the description according to the method embodiments.

With the above descriptions of the disclosed embodiments, those skilled in the art may achieve or use the present disclosure. Various modifications to the embodiments are apparent for those skilled in the art. The general principle defined herein may be implemented in other embodiments without departing from the spirit or scope of the disclosure. Therefore, the present disclosure is not limited to the embodiments disclosed herein, but confirm to the widest scope in consistent with the principle and the novel features disclosed herein.

What is claimed is:

1. A data transmission method, comprising:
    determining a first type for data to be transmitted by a first data terminal in a local area network, wherein the local area network comprises a plurality of data terminals, and the first data terminal is one of the data terminals comprised in the local area network;
    detecting data of the first type stored in the data terminals other than the first data terminal in the local area network;
    transmitting the data of the first type stored in all data terminals comprised in the local area network to a server in accordance with a first predetermined rule;
    wherein the transmitting the data of the first type stored in all data terminal comprised in the local area network to a server in accordance with a first predetermined rule comprises:
    counting first data amounts of the data of the first type stored in respective data terminals in the local area network;
    determining one or more target data terminals in the local area network based on the first data amounts; and
    controlling the one or more target data terminals to transmit directly the data of the first type currently stored in the one or more target data terminals to the server after the one or more target data terminals receives the detected data of the first type from data terminals with data to be transmitted in the local area network in accordance with a second predetermined rule, wherein the data terminals with data to be transmitted are data terminals other than the one or more target data terminals in the local area network;
    wherein after the counting first data amounts of the data of the first type stored in respective data terminals in the local area network, and before the determining one or more target data terminals based on the first data amount, the method further comprises:
    determining whether there is a data terminal of which the first data amount reaches a predetermined data granularity threshold or a current length of time for data acquisition reaches a predetermined first time threshold in the local area network;
    determining the data terminal of which the first data amount reaches the predetermined data granularity threshold or the current length of time for data acquisition reaches the predetermined first time threshold as a target data terminal and controlling the target data terminal to transmit directly the data of the first type currently stored in the target data terminal to the server;
    wherein after the counting first data amounts of the data of the first type stored in respective data terminals in the local area network, the method further comprises:
    summing current lengths of time of data acquisition for respective data terminals in the local area network to obtain a current total length of acquisition time; and
    adjusting the predetermined first time threshold according to a predetermined second attenuation function when the current total length of acquisition time reaches a predetermined second attenuation threshold.

2. The method according to claim 1, wherein
    the determining one or more target data terminals in the local area network based on the first data amounts comprises:
    determining, from all data terminals in the local area network, one or more data terminals as the one or more target data terminals, wherein the first data amount of the data of the first type stored in each of the one or more data terminals is greater than a first threshold.

3. The method according to claim 1, wherein after the determining a first type for data, and before the detecting the data of the first type stored in the data terminals in the local area network, the method further comprises:
    broadcasting data information to the local area network, wherein the data information comprises the first type of the data to be transmitted by the first data terminal.

4. The method according to claim 1, wherein after the counting first data amounts of the data of the first type stored in respective data terminals in the local area network, the method further comprises:
    summing the first data amounts of the data of the first type stored in respective data terminals in the local area network to obtain a current total data amount; and
    adjusting the predetermined data granularity threshold according to a predetermined first attenuation function when the current total data amount reaches a predetermined first attenuation threshold.

5. A system for data transmission, comprising:
    at least one processor;
    a memory having processor-executable instructions stored therein, wherein the processor-executable instructions, when executed by the at least one processor, configure the processor to:
    determine a first type for data to be transmitted by a first data terminal in a local area network, wherein the local area network comprises a plurality of data terminals, and the first data terminal is one of the data terminals comprised in the local area network;
    detect data of the first type stored in the data terminals other than the first data terminal in the local area network;
    transmit the detected data of the first type stored in all data terminal comprised in the local area network to a server in accordance with a first predetermined rule;
    count first data amounts of the data of the first type stored in respective data terminals in the local area network;
    determine one or more target data terminals in the local area network based on the first data amounts;
    control the one or more target data terminals to transmit directly the data of the first type currently stored in the one or more target data terminals to the server;

determine whether there is a data terminal of which the first data amount reaches a predetermined data granularity threshold or a current length of time for data acquisition reaches a predetermined first time threshold in the local area network;

determine the data terminal of which the first data amount reaches the predetermined data granularity threshold or the current length of time for data acquisition reaches the predetermined first time threshold as a target data terminal and control the target data terminal to transmit directly the data of the first type currently stored in the target data terminal to the server;

sum current lengths of time of data acquisition for respective data terminals in the local area network to obtain a current total length of acquisition time; and adjust the predetermined first time threshold according to a predetermined second attenuation function when the current total length of acquisition time reaches a predetermined second attenuation threshold.

6. The system according to claim 5, wherein the processor-executable instructions, when executed by the at least one processor, configure the processor to:

determine, from all data terminals in the local area network, one or more data terminals as the one or more target data terminals, wherein the first data amount of the data of the first type stored in each of the one or more data terminals is greater than a first threshold.

7. The system according to claim 5, wherein the processor-executable instructions, when executed by the at least one processor, configure the processor to:

broadcast data information to the local area network, wherein the data information comprises the first type of the data to be transmitted by the first data terminal.

8. The system according to claim 5, wherein the processor-executable instructions, when executed by the at least one processor, configure the processor to:

sum the first data amounts of the data of the first type stored in respective data terminals in the local area network to obtain a current total data amount; and adjust the predetermined data granularity threshold according to a predetermined first attenuation function when the current total data amount reaches a predetermined first attenuation threshold.

9. The method according to claim 1, further comprising:

counting first data amounts of the data of the first type stored in respective data terminals in the local area network;

summing the first data amounts of the data of the first type stored in respective data terminals in the local area network to obtain a current total data amount;

summing current lengths of time of data acquisition for respective data terminals in the local area network to obtain a current total length of acquisition time;

adjusting the predetermined data granularity threshold according to a predetermined first attenuation function when it is determined the current total data amount reaches a predetermined first attenuation threshold; and adjusting the predetermined first time threshold according to a predetermined second attenuation function when it is determined the current total length of acquisition time reaches a predetermined second attenuation threshold.

\* \* \* \* \*